United States Patent Office

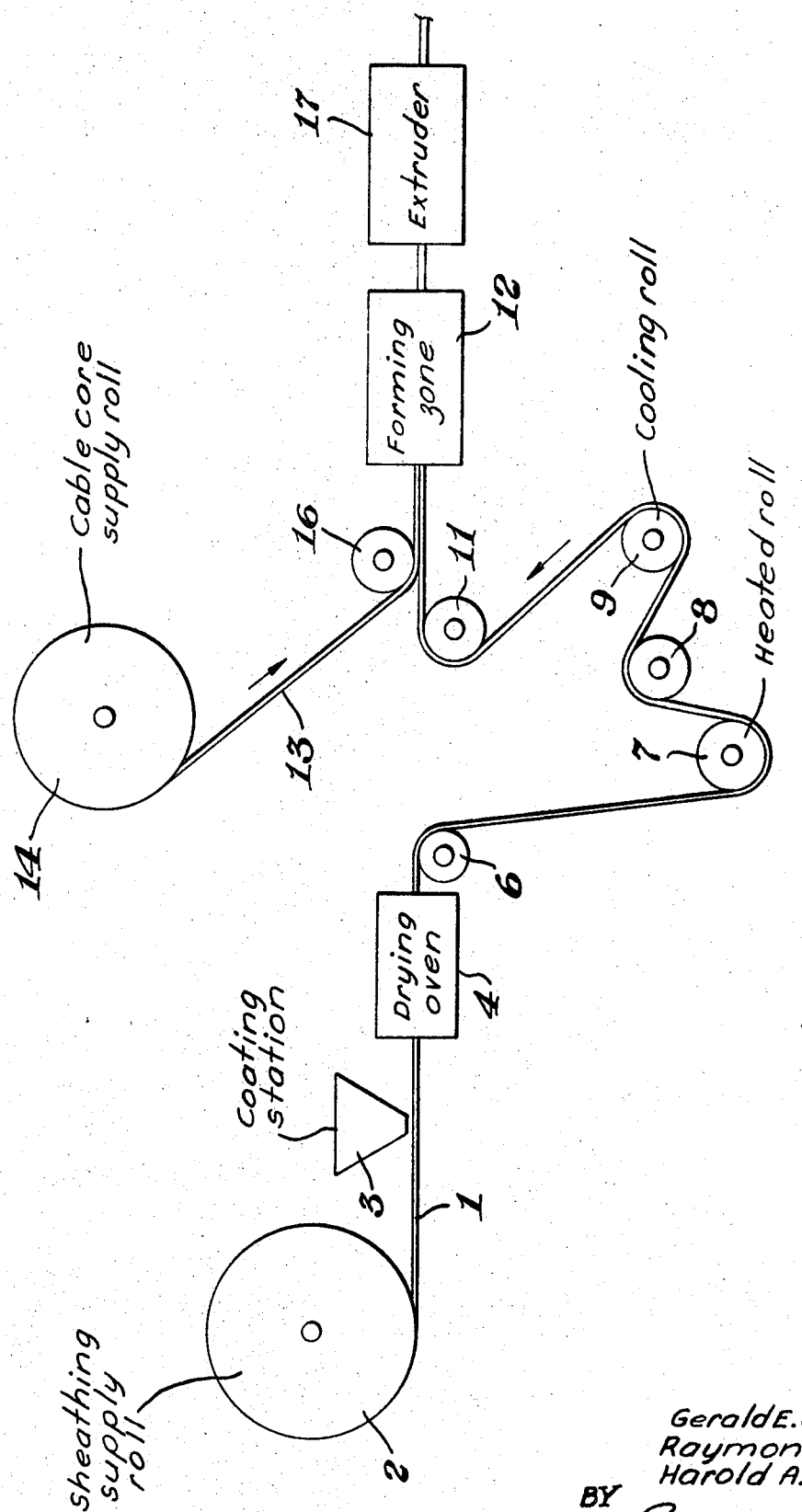

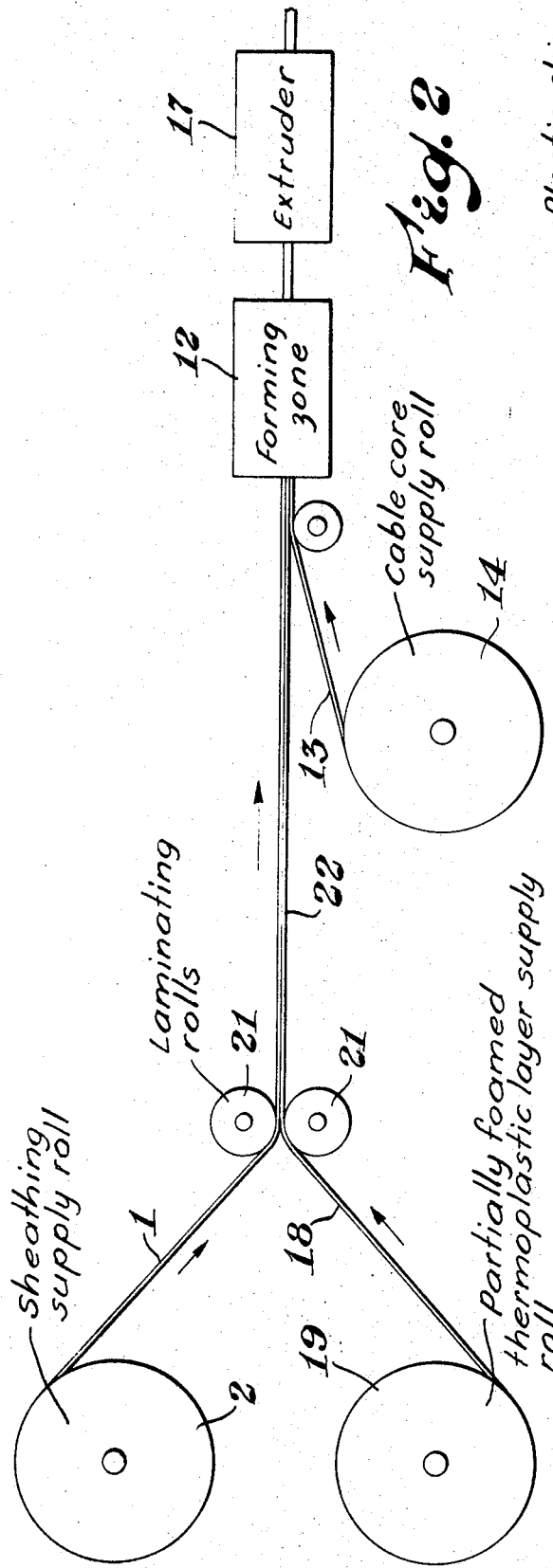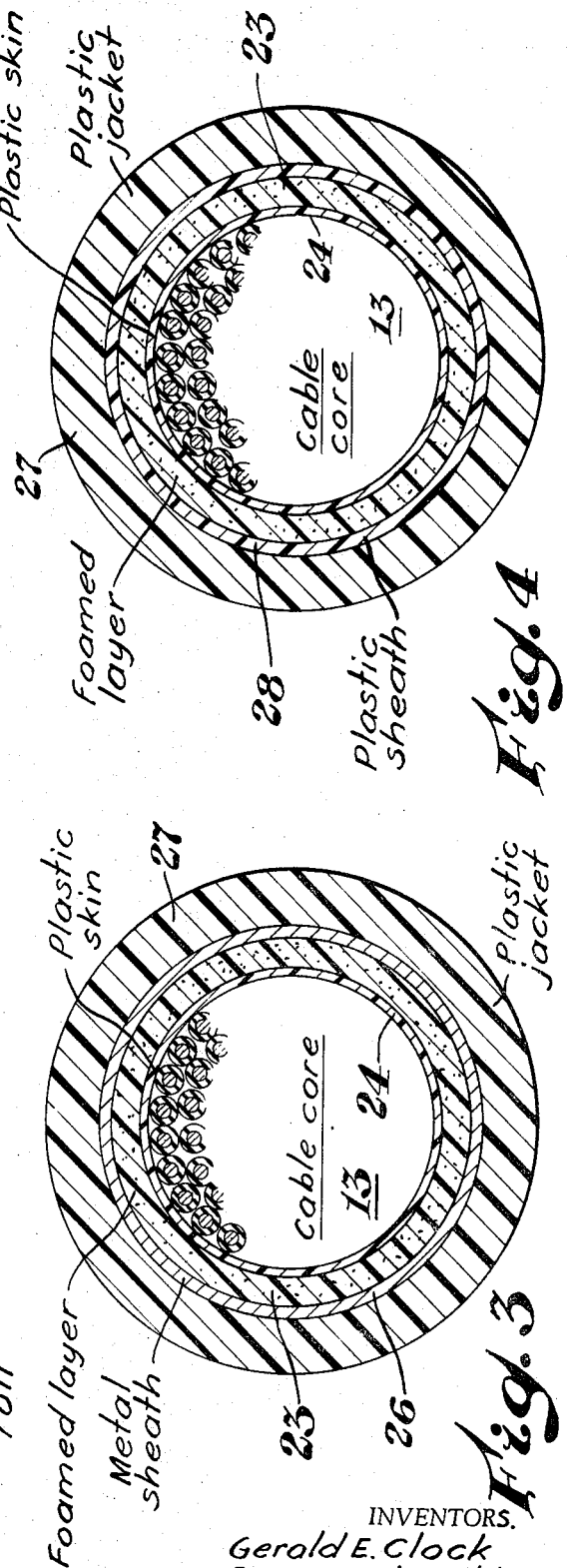

3,687,748
Patented Aug. 29, 1972

3,687,748
METHOD OF FABRICATING CABLES
Gerald E. Clock and Raymond C. Mildner, Midland, and Harold A. Walters, Beaverton, Mich., assignors to The Dow Chemical Company, Midland, Mich.
Original application Oct. 24, 1968, Ser. No. 770,312. Divided and this application Apr. 9, 1970, Ser. No. 31,444
Int. Cl. H01b 7/18, 13/06, 13/26
U.S. Cl. 156—56                    5 Claims

ABSTRACT OF THE DISCLOSURE

A thermal barrier laminate in the form of a strip for fabricating cables and the like comprises a substrate of, for example, aluminum and a layer of a partially foamed thermoplastic material such as polypropylene. A cable having the thermal barrier laminate is fabricated by wrapping the laminate around a cable core and subsequently extruding a jacket of plastic material over the laminate under conditions of temperature and pressure to substantially completely foam the layer of partially foamed thermoplastic material. The partially foamed thermoplastic layer serves as an insulator to protect the cable core from the heat of extrusion and at the same time expands further during extrusion to provide a substantially continuous inner layer between the cable core and the outer jacket.

---

This application is a divisional application of Ser. No. 770,312 filed Oct. 24, 1968, now abandoned.

This invention relates to thermal barrier laminates for cables and the like. In one aspect, this invention relates to methods of fabricating cables having a thermal barrier. In another aspect, this invention relates to cables having a layer of a foamed thermoplastic material surrounding the cable core.

Cables having thermal barriers to protect the core of the cable from the heat generated during the extrusion of an outer jacket on the cable are fabricated by two distinct prior art techniques. In one of these techniques, a substrate is coated with a foamable coating and the resulting composite wrapped around the cable core such that the foamable coating is in contact with the core. The cable core including the wrapped composite is then passed through an extruder to form an outer plastic jacket on the cable. The heat imparted to the cable core including the composite during extrusion serves to foam the coating and thereby form a cellular layer between the cable core and the substrate of the composite.

In another technique for constructing a cable having a thermal barrier, a substrate is coated with a foamable material to produce a composite which is subjected to heat to cause the material to foam and form a cellular layer on the substrate. The composite including the foamed layer is then wrapped around a cable core such that the foamed layer is in contact with the core. The cable core including the composite is then passed through an extruder to produce a cable having an outer plastic jacket. The foamed layer serves as an insulator to protect the cable core from the heat generated during extrusion.

Both of the techniques outlined above for fabricating a cable having a thermal barrier are described in U.S. Pat. 3,344,228 granted Sept. 26, 1967. While the techniques outlined in Pat. 3,344,228 represent a substantial advancement in the cable fabrication art, the present invention is an improvement thereon in terms of providing even a better thermal barrier in cables and the like. The use of the heat of extrusion to produce the foamed layer as described in the patent noted above is not completely satisfactory in instances where a substantial amount of heat is transmitted to the cable core before the foamed layer is sufficiently developed to serve as a thermal barrier. Although the use of a fully developed foamed layer prior to the passage of the cable core through the extruder does indeed prevent substantial transmission of heat to the core, when the surface of the core is uneven such as by the projection of one or more of the conductors outward from the surface of the core the foam can collapse or become ruptured in these areas such that the cable core is no longer insulated from the heat present in the outer plastic jacket during the extrusion operation. Further, when a fully developed foamed layer is wrapped around the cable core prior to the extrusion of the outer plastic jacket, the wrapping operation can develop creases in the foamed layer. These creases are undesirable because heat is easily conducted through them into the cable core and because the outer plastic jacket of the cable will be uneven in thickness due to the creases in the foamed layer.

According to this invention, a cable is provided with a thermal barrier for insulating the cable core from the heat generated during the extrusion of an outer plastic jacket by positioning around the cable core a thermal barrier laminate in the form of a cable core wrap comprising a substrate and a layer of a partially foamed thermoplastic material adhered to the substrate. The thermal barrier laminate is wrapped around the cable core such that the partially foamed thermoplastic layer is in contact with the cable core or such that the substrate is in contact with the cable core. In a modification of this embodiment of the invention, the partially foamed thermoplastic material is adhered to the substrate by means of a coating of an adhesive copolymer of ethylene and an ethylenically unsaturated carboxylic acid. In a further modification of this embodiment of the invention, both surfaces of the substrate are provided with coatings of an adhesive copolymer of ethylene and an ethylenically unsaturated carboxylic acid. In the latter case, the adhesive copolymer coatings serve to bond the partially foamed thermoplastic material to the substrate and to bond the substrate to the extruded jacket or to bond the substrate to the cable core depending upon the location of the substrate of the thermal barrier laminate. In yet another modification of this embodiment of the invention, the layer of partially foamed thermoplastic material of the thermal barrier laminate is provided with a skin of substantially solid thermoplastic material on the outer surface thereof. When the thermal barrier laminate is wrapped around the cable core according to this modification of the invention, the skin of thermoplastic material is in contact with either the surface of the core or in contact with the outer plastic jacket.

A cable constructed in accordance with this invention comprises a cable core of at least one conductor having an exterior insulating layer; a cable core wrap comprising a sheathing member and a layer of a foamed thermoplastic material surrounding the core, said layer of foamed thermoplastic material having a skin of substantially solid thermoplastic material; and a jacket of plastic material surrounding the cable core wrap. As previously indicated, the cable core wrap is positioned such that the skin is in contact with either the cable core or with the jacket of plastic material.

The cables of this invention are fabricated by a method which comprises the steps of passing a cable core of at least one insulated conductor to a forming zone, passing a laminate in the form of a strip comprising a sheathing member and a layer of partially foamed thermoplastic material to the forming zone, wrapping the laminate around the cable core in the forming zone such that the layer of partially foamed thermoplastic material of the laminate is in contact with the cable core or such that the substrate of the laminate is in contact with the cable core, and extruding a jacket of the plastic material over the sheathing member of the laminate under conditions of temperature and pressure to substantially completely foam the layer of partially foamed thermoplastic material of the laminate.

In practicing the method of this invention, the laminate can be prepared by applying a coating of a foamable thermoplastic material on the sheathing member and subsequently passing the thus coated sheathing member into contact with a heated roll to partially foam the thermoplasic material. In a modifiaction of this embodiment of the invention, a coaing of an adhesive copolymer of ethylene and an ethylenicaly unsaturated carboxylic acid can optionally be applied to one or both surfaces of the sheathing member before the foamable thermoplastic material is applied.

The laminate can also be prepared by passing the sheathing member and a preformed layer of partially foamed thermoplastic material between the nip of a pair of laminating rolls to effect a bond therebetween. In a modification of this embodiment of the invention, a coating of an adhesive copolymer of ethylene and an ethylenically unsaturated carboxylic acid can optionally be applied to one or both surfaces of the sheathing member before the preformed layer of partially foamed thermoplastic material is bonded thereto.

In all of the embodiments relating to the fabrication of a cable having a thermal barrier, the layer of partially foamed thermoplastic material of the laminate can optionally have a skin of substantially solid thermoplastic material on its outer surface. The skin of substantially solid thermoplastic material on the outer surface of the foamed thermoplastic layer of the thermal barrier laminate can be formed by a variety of different ways depending to a large extent upon the technique employed in preparing the thermal barrier laminate. In this regard, when the partially foamed thermoplastic material of the thermal barrier laminate is preformed, the skin can be made by, for example, confining the expansion of the preformed layer and thus causing a build-up of the solid thermoplastic material. When the partially foamed thermoplastic layer of the thermal barrier laminate is formed by passing the sheathing member and coating of foamable material into contact with a heated roll, the skin of solid thermoplastic material can be formed by controlling the tension of the sheathing member as it passes over the heated roll. The laminate having the partially foamed thermoplastic layer can then be passed over a cooling roll under sufficient tension to maintain the integrity of the skin.

Accordingly, it is an object of this invention to provide a thermal barrier laminate for cables and the like.

Another object of this invention is to provide a cable having an improved thermal barrier.

A further object of this invention is to provide a method of fabricating cables having thermal barrier laminates.

These and other objects of the invention will become apparent to one skilled in the art after studying the following detailed description, the appended claims, and the accompanying drawings wherein:

FIG. 1 is a schematic illustration of an apparatus for fabricating a cable in accordance with one embodiment of the invention;

FIG. 2 is a schematic illustration of an apparatus for fabricating a cable according to another embodiment of the invention;

FIG. 3 is an end view of a cable constructed in accordance with the invention; and FIG. 4 is an end view of a cable constructed according to another embodiment of the invention.

Referring now to the drawings, wherein like reference numerals are used to denote like elements wherever possible, the invention will be described in more detail. Many controls, idler pulleys, tension rolls, directional rolls, heaters, and the like, not necessary in explaining the invention to one skilled in the art, have been omitted from the drawings for the sake of clarity.

In FIG. 1, a cable having a thermal barrier laminate is fabricated according to one embodiment of the invention by removing a substrate 1 in the form of a strip from a sheathing supply roll 2 and passing it beneath a coating station 3 to deposit a coating of a foamable thermoplastic material on one surface of the substrate. It is generally preferred that a narrow strip along one edge of the substrate be left uncoated. This narrow strip will make up the overlap when the thermal barrier laminate is positioned around a cable core. The absence of a layer of foam in the vicinity of overlap results in a smooth surface along the seam of the overlap.

The substrate 1 having the coating of foamable thermoplastic material is then passed through a drying oven 4 which removes any moisture present in the coating as an incident to the coating operation. Upon leaving the drying oven 4, the coated substrate is passed over a directional roll 6 and a heated roll 7 which imparts heat to the coating to partially foam the thermoplastic material. The degree of foam imparted to the coating of thermoplastic material is controlled by regulating the temperature of the heated roll 7, the rate of travel of the substrate 1 as it passes over the heated roll, the tension maintained in the substrate 1 as it passes over the several rolls, and the like. These variables can also be used to produce a skin of substantially solid thermoplastic material on the outer surface of the partially foamed thermoplastic material in accordance with that embodiment of the invention.

The substrate 1 including the partially foamed thermoplastic material is then passed over a directional roll 8 and a cooling roll 9 to reduce the temperature of the thermoplastic material as may be necessary to prevent further foaming of the thermoplastic material. The cooling roll 9 can also be used to form and/or maintain the integrity of a skin on the outer surface of the foamed thermoplastic layer when a skin is formed.

The thermal barrier laminate comprising the substrate 1 and the partially foamed thermoplastic layer is then passed over directional roll 11 to a forming zone 12. A cable core 13 is withdrawn from a cable core supply roll 14 and passed over directional roll 16 to forming zone 12 simultaneously with the passage of the thermal barrier laminate. The forming zone 12 includes apparatus for positioning the thermal barrier laminate around the cable core 13. The thermal barrier laminate can be helically wound around the cable core 13 or longitudinally folded around the cable core 13, as desired. The thermal barrier laminate is positioned around the cable core 13 such that the layer of partially foamed thermoplastic material is in contact with the surface of the cable core. If desired, the thermal barrier laminate can be wrapped around the cable core such that the substrate 1 is in contact with the cable core 13. The latter construction is generally preferred when the substrate 1 is fabricated of a plastic material.

The cable core 13 including the thermal barrier laminate in the form of a sheathing member is then passed through an extruder 17 which extrudes a jacket of a plastic material over the sheathing member. The extruder 17 is operated under conditions of temperature and pressure to substantially completely foam the layer of partially foamed thermoplastic material of the thermal barrier laminate. In this environment, the partially foamed thermoplastic layer of the thermal barrier laminate serves two main functions. First, the partially foamed layer insulates the cable core from the heat generated during extrusion. Second, the partially foamed layer expands further during the extrusion operation to completely fill any voids which may exist between the outer surface of the cable core and the thermal barrier laminate. This results in a stronger and more durable cable since there is less chance for the several concentric layers of the cable to move longitudinally or radially relative to each other.

In the embodiment of the invention illustrated by FIG. 2, a preformed partially foamed thermoplastic layer 18 is removed from a supply roll 19 and passed between laminating rolls 21 along with the substrate 1 from the sheathing supply roll 2. The laminating rolls 21 effect a bond between the substrate 1 and the partially foamed thermoplastic layer 18 to produce the thermal barrier laminate 22. The laminating rolls 21 can be heated if desired.

The cable core 13 is removed from the supply roll 14 and passed to the forming zone 12 along with the thermal barrier laminate 22. The forming zone 12 includes apparatus which positions the thermal barrier laminate 22 around the cable core 13 such that the partially foamed thermoplastic layer 18 is in contact with the outer surface of the cable core 13. As previously indicated, the thermal barrier laminate 22 can be wrapped around the cable core 13 such that the substrate 1 is in contact with the cable core. This is accomplished by longitudinally folding or helically winding the thermal barrier laminate 22 around the cable core 13. The cable core including the wrapped thermal barrier laminate is then passed to extruder 17 which forms a jacket of a plastic material around the sheathing member. As described in connection with the method illustrated by FIG. 1, the temperature and pressure of the extruder 17 is regulated to substantially completely foam the preformed layer of partially foamed thermoplastic material. As previously indicated, the substrate 1 can have one or both sides coated with an adhesive copolymer of ethylene and an ethylenically unsaturated carboxylic acid. Also, the preformed partially foamed thermoplastic layer 18 can have a skin of substantially solid thermoplastic material on the surface thereof which contacts the cable core 13 or which contacts the outer plastic jacket.

The cable construction illustrated by FIG. 3 of the drawing comprises a cable core 13 of a multitude of insulated conductors, a cable core wrap comprising a layer of a foamed thermoplastic material 23 having a skin 24 of substantially solid thermoplastic material, a metal sheathing member 26 surrounding the foamed layer 23, and an outer plastic jacket 27 surrounding the sheathing member 26. The metal sheathing member 26 can optionally have a coating of an adhesive copolymer of ethylene and an ethylenically unsaturated carboxylic acid on one or both sides.

The cable construction illustrated by FIG. 4 is substantially the same as that illustrated by FIG. 3 except that the cable core wrap has a plastic sheathing member 28 instead of the metal sheathing member 26 as described in connection with FIG. 3. In this construction, the foamed layer 23 is mounted around the cable core 13 such that the solid plastic skin 24 is in contact with the outer surface of the core 13. The outer plastic jacket 27 surrounds the plastic sheathing member 28. The plastic sheathing member 28 can optionally have one or both sides coated with an adhesive copolymer of ethylene and an ethylenically unsaturated carboxylic acid if desired.

The thermal barrier laminates of this invention can be fabricated from any suitable metal substrate such as, for example, aluminum, copper, tin, steel, tin-plated steel, copper-bronze, copper-clad steel, galvanized iron, combinations of the foregoing, and the like. The substrate can also be fashioned of a suitable plastic such as, for example, polyethylene, polypropylene, poly(ethylene terephthalate), and the like. When a metal is used to fabricate the substrate, it can be of a thickness sufficient to act as a shielding member in addition to serving as a sheath for the cable core.

The partially foamed layer of the thermal barrier laminate can be fabricated from any suitable thermoplastic material. It is generally preferred that the thermoplastic material of the partially foamed layer be of a type which will not be materially affected by the heat during extrusion of the outer plastic jacket. For example, the thermoplastic material should have a melting point sufficiently high so that the heat imparted to it during the extrusion operation will not collapse the foam. Exemplary thermoplastic material which can be used to fabricate the partially foamed layer include polyethylene, polypropylene, copolymers of methyl methacrylate and acrylonitrile, poly(4-methyl pentene), poly(ethylene terephthalate), copolymers of methyl methacrylate and methyl acrylate, and the like.

The adhesive copolymer which can optionally be applied to one or both surfaces of the substrate of the thermal barrier laminate can be of any composition which adhesively bonds the partially foamed thermoplastic layer and/or the outer plastic jacket to the substrate. Exemplary adhesive copolymers which can be used include random or graft copolymers of ethylene containing between about 1 and about 20 weight percent combined unsaturated carboxylic acid or acid anhydride having up to 8 carbon atoms per molecule and partial esters of any such unsaturated acid wherein the acid moiety has at least one carboxyl group and the alcohol moiety has up to about 20 carbon atoms. Illustrative ethylenically unsaturated acids and acid anhydrides which can be polymerized with ethylene to form the adhesive copolymer include acrylic acid, methacrylic acid, crotonic acid, fumaric acid, maleic acid, itaconic acid, maleic anhydride, monomethyl maleate, monomethyl fumarate, monoethyl fumarate, and the like.

The outer plastic jacket which is extruded onto the thermal barrier laminate can be of any suitable plastic material such as, for example, polyethylene, copolymers of two or more monomers, polymer blends, and the like. The plastic jacket can have conventional additives such as carbon black and the like. While the outer plastic jacket can be of any thickness, it is generally preferred that it be at least thick enough to provide a smooth exterior surface on the final product.

The term "degree of foam" as used herein is intended to mean the percent of foam of the partially foamed thermoplastic material based upon this material when it is completely foamed. The partially foamed thermoplastic material of the thermal barrier laminate should have a degree of foam which is sufficient to provide a thermal barrier which will insulate the core from the heat of extrusion and still expand further during the extrusion of the outer plastic jacket. It is generally preferred that the partially foamed thermoplastic material have a degree of foam up to about 95 percent. When operating at the upper limit of this range, the partially foamed thermoplastic material will foam about another 5 percent during the extrusion of the outer plastic jacket. The partially foamed thermoplastic material having latent blowing agents which will cause the thermoplastic material to foam further is formed by quenching or otherwise preventing the blowing agent from completely vaporizing or completely decomposing during the production of the partially foamed layer. Any suitable volatile blowing agent well known in the art such as pentane or any suitable decomposable blowing agent such as ammonium carbonate can be used to form the partially foamed thermoplastic layer of the thermal barrier laminate.

In practicing the method of the invention illustrated by FIG. 1 of the drawings, the coating of foamable thermoplastic material which is deposited on the substrate comprises a latex of discrete polymer particles each containing a volatile organic blowing agent and a binder material. The latex is deposited at a rate to produce the desired thickness on the substrate. The polymer particles containing a volatile blowing agent can be prepared by any suitable technique such as that disclosed in U.S. Pat. 3,293,114 granted Dec. 20, 1966, the disclosure of which is specifically incorporated herein by reference.

The thickness of the several layers in the cables of this invention can vary over wide limits and are largely a matter of personal choice dependent upon, for example, the type of cable produced. In that embodiment of the invention wherein a skin of substantially solid thermoplastic material is formed in the foamed thermoplastic layer, it is generally preferred that the skin have a thickness which in cross-sectional area represents at least about 5 percent of the total cross-sectional area of the layer of foamed thermoplastic material.

The following examples will serve to further illustrate the invention. It must be understood that these examples are for the purpose of illustration only and should not be construed as limiting of the invention.

EXAMPLE I

A thermal barrier laminate was prepared by cutting a 2½ inch wide strip from a 36 inch wide strip of 8 mil thick aluminum having a coating 2 mils thick on each side of a copolymer of ethylene and acrylic acid containing about 8 percent by weight combined acid. The 2½ inch wide strip was coated with a foamable thermoplastic material obtained by mixing about 140 grams of a suspension containing 40 weight percent solids in water of a copolymer of 95 percent methyl methacrylate and 5 percent acrylonitrile; about 85 grams of a blend of about 53 weight percent styrene, about 43 weight percent butadiene, about 3 weight percent fumaric acid, and about 1 weight percent acrylic acid; about 1 gram of a 30 weight percent solution of sodium lauryl sulfate; and about 3.5 grams of a 5 weight percent solution of sodium polyacrylate. The copolymer of methyl methacrylate and acrylonitrile was in the form of microspheres and contained about 35 weight percent neopentane. The foamable thermoplastic materials was applied to the 2½ inch wide substrate over a width about 2⅜ inch wide thereby leaving an uncoated strip about ⅛ inch wide along one edge of the substrate. After the foamable thermoplastic coating dried, the substrate was passed over a roll heated to a temperature of about 340° F. such that the coated side of the substrate contacted the roll over a distance corresponding to about 180° of its surface. The substrate was maintained under tension of about 10 pounds. The substrate travelled at a rate such that the coating remained in contact with the heated roll for a period of about 20 seconds. Upon inspecting the thermal barrier laminate thus produced, the surface texture was satisfactory and the adhesion of the partially foamed thermoplastic layer to the aluminum substrate was excellent. The thermal barrier laminate had a thickness of about 40 mils. This thickness indicates that the foamable thermoplastic coating expanded about 19 times its original thickness.

EXAMPLE II

A thermal barrier laminate is prepared by laminating a 3 inch wide strip of polyethylene to a 3 inch wide strip of polypropylene having a degree of foam of about 50 percent by passing the strips between the nip of a pair of laminating rolls. The laminating rolls are heated slightly to form a bond between the substrate and the partially foamed polypropylene strip.

EXAMPLE III

The procedure of Example II is substantially repeated except that the polyethylene substrate has a relatively thin coating on one surface of a copolymer of ethylene and acrylic acid containing about 8 percent by weight combined acrylic acid. The thermal barrier laminate is prepared by passing the coated polyethylene strip and the partially foamed polypropylene strip between the laminating rolls such that the copolymer coating of ethylene and acrylic acid is sandwiched between the polyethylene strip and the partially foamed polypropylene strip.

EXAMPLE IV

The thermal barrier laminate prepared according to the procedures outlined in Example I is passed to a forming zone along with a cable core comprising a multitude of insulated pairs of conductors. The thermal barrier laminate is longitudinally folded around the cable core in the forming zone such that the partially foamed layer contacts the surface of the cable core. The cable core including the thermal barrier laminate is then passed through a cross-head extruder which extrudes a jacket of polyethylene over the exposed surface of the thermal barrier laminate. The heat imparted to the partially foamed thermoplastic layer causes the thermoplastic material to substantially completely foam and thereby produce a substantially continuous interlayer between the surface of the cable core and the substrate of the thermal barrier laminate.

While the thermal barrier laminate in its most preferred form has only one layer of a partially foamed thermoplastic material, in some cable constructions it may be desirable to employ one or more layers of partially foamed thermoplastic material on each side of the sheathing member. Similarly, cables fabricated with the thermal barrier laminates of this invention do not have to be produced continuously as described in connection with FIGS. 1 and 2 of the drawings since it may be desirable in certain situations to prepare the thermal barrier laminates in a separate step and subsequently fabricate a cable at a later time. It is also within the spirit and scope of the invention to eliminate the drying step and/or the cooling step described in connection with the method illustrated by FIG. 1.

Although the invention has been described in considerable detail, it must be understood that such description is for that purpose only and should not be construed as limiting of the invention.

What is claimed is:

1. A method of fabricating a cable having a thermal barrier comprising the steps of passing a cable core of at least one insulated conductor to a forming zone, passing a laminate in the form of a strip comprising a sheathing member and a layer of a partially foamed thermoplastic material to said forming zone, wrapping said laminate around said cable core in said forming zone, and extruding a jacket of a plastic material over said laminate under conditions of temperature and pressure to substantially completely foam the layer of partially foamed thermoplastic material of said laminate.

2. A method according to claim 1 wherein said laminate is prepared by applying a coating of a foamable thermoplastic material on the sheathing member and subsequently passing the thus coated sheathing member into contact with a heated roll to partially foam the thermoplastic material.

3. A method according to claim 2 which includes the step of applying a coating of an adhesive copolymer of ethylene and an ethylenically unsaturated carboxylic acid on the sheathing member before the foamable thermoplastic material is applied.

4. A method according to claim 1 wherein said laminate is prepared by passing the sheathing member and the layer of partially foamed thermoplastic material between the nip of a pair of laminating rolls to effect a bond therebetween.

5. A method according to claim 4 which includes the step of applying a coating of an adhesive copolymer of etheylene and an ethylenically unsaturated carboxylic acid on the sheathing member before the layer of partially foamed thermoplastic material is bonded thereto.

References Cited

UNITED STATES PATENTS 3,064,073  11/1962  Downing et al. _____ 264—174
3,344,228   9/1967  Woodland et al. _____ 156—79
3,437,536   4/1969  Vincent et al. _____ 174—110.8
3,499,819   3/1970  Lewis _____ 264—45

WILLIAM J. VAN BALEN, Primary Examiner

U.S. Cl. X.R.

156—79; 161—161, 175, 216, 252; 174—107, 110 F, 120 SR